United States Patent
Jainek

(10) Patent No.: US 10,343,092 B2
(45) Date of Patent: Jul. 9, 2019

(54) FILTER SYSTEM AND FILTER ELEMENT HAVING A SEALING DEVICE

(71) Applicant: MANN+HUMMEL GMBH, Ludwigsburg (DE)

(72) Inventor: Herbert Jainek, Heilbronn (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 89 days.

(21) Appl. No.: 15/180,013

(22) Filed: Jun. 11, 2016

(65) Prior Publication Data
US 2016/0279547 A1    Sep. 29, 2016

Related U.S. Application Data

(63) Continuation of application No. PCT/EP2014/076607, filed on Dec. 4, 2014.

(30) Foreign Application Priority Data

Dec. 11, 2013 (DE) .................. 20 2013 011 841 U
Aug. 12, 2014 (DE) ........................ 10 2014 011 786

(51) Int. Cl.
| | |
|---|---|
| B01D 35/30 | (2006.01) |
| F02M 37/22 | (2019.01) |
| F01M 11/03 | (2006.01) |
| B01D 29/13 | (2006.01) |
| B01D 35/00 | (2006.01) |
| F16J 15/02 | (2006.01) |

(52) U.S. Cl.
CPC ............. *B01D 35/30* (2013.01); *B01D 29/13* (2013.01); *B01D 35/005* (2013.01); *F01M 11/03* (2013.01); *F02M 37/22* (2013.01); *F16J 15/025* (2013.01); *B01D 2201/295* (2013.01); *B01D 2201/304* (2013.01); *B01D 2201/305* (2013.01); *B01D 2201/34* (2013.01)

(58) Field of Classification Search
CPC ........ B01D 2201/304; B01D 2201/305; B01D 2201/34; B01D 35/30; B01D 2201/295
See application file for complete search history.

(56) References Cited

U.S. PATENT DOCUMENTS

| | | | |
|---|---|---|---|
| 4,721,563 | A | 1/1988 | Rosaen |
| 5,753,120 | A | 5/1998 | Clausen et al. |
| 6,308,836 | B1 | 10/2001 | Guichaoua et al. |
| 8,480,892 | B2 | 7/2013 | Jainek et al. |
| 8,501,002 | B2 | 8/2013 | Knickmann et al. |
| 8,550,255 | B2 | 10/2013 | Sakraschinsky et al. |
| 8,827,084 | B2 | 9/2014 | Zhu et al. |
| 8,858,793 | B2 | 10/2014 | Roesgen |

(Continued)

FOREIGN PATENT DOCUMENTS

| | | |
|---|---|---|
| DE | 3641348 A1 | 6/1988 |
| FR | 2598936 A1 | 11/1987 |

*Primary Examiner* — Patrick J Orme
(74) *Attorney, Agent, or Firm* — James Hasselbeck

(57) ABSTRACT

Disclosed is a filter system having a filter element (10), a filter housing and a sealing device (20) sealing off a housing interior space (120) from a surrounding environment (122). The sealing device (20) has a seal (24) arranged on a seal carrier (22). Also disclosed is a sealing device (20) for the installation in such a filter system (100) and an arrangement comprising a filter element (10) and a sealing device (20).

14 Claims, 6 Drawing Sheets

(56) References Cited

U.S. PATENT DOCUMENTS

| | | |
|---|---|---|
| 2002/0158006 A1 | 10/2002 | Thomas |
| 2009/0127198 A1 | 5/2009 | Salvador et al. |
| 2010/0170842 A1* | 7/2010 | Knickmann ........... B01D 29/21 |
| | | 210/236 |
| 2011/0132828 A1 | 6/2011 | Ries et al. |
| 2012/0193281 A1* | 8/2012 | Zhu ....................... B01D 29/11 |
| | | 210/450 |

\* cited by examiner

FILTER SYSTEM AND FILTER ELEMENT HAVING A SEALING DEVICE

TECHNICAL FIELD

The invention relates to a filter system for filtering a fluid, having a sealing device, in particular for use as an oil or fuel filter of an internal combustion engine of a motor vehicle, also a filter element and a sealing device for installation in a filter system of this type.

BACKGROUND

From DE 20 2006 018 335 U1, a filter system having a replaceable filter element is known on which the seal is displaceable in the axial direction and is captively held. In particular, the seal comprises a seal carrier with a sealing ring extending around the filter element, wherein the circumferential seal carrier is provided with at least one securing edge to the inside relative to a radial direction. Herein, the filter element comprises at each of its ends situated in the axial direction an end stop for the securing edge, configured, in particular, as an end disk. The captive holding of the seal on the filter element leads thereto that when the filter element is removed from the filter housing, the seal for both the housing parts is also removed and cannot be re-used. The similar filter element to be newly inserted carries the captively held seal which is brought into position on insertion of the new filter element. The new seal cannot be forgotten. The axial displaceability of the seal initially permits the filter element to be positioned without the seal causing any interference. The seal can be brought into its intended mounting position regardless of the position of the filter element. The possibility exists, in particular, of inserting similar filter inserts in different filter housings with differently positioned separating planes. By means of axial displacement, the seal can be brought into different mounting positions. Herein, the installation direction of the filter element is not important. For simplification of the handling, the user can introduce the filter element into the housing in any desired direction, wherein the seal is displaced into the relevant axial position.

SUMMARY

It is therefore an object of the invention to provide a filter system for filtering a fluid that, with a simple and mechanically stable design, allows use of a seal and also replacement if there is a maintenance action.

It is a further object of the invention to provide a filter element for installation in such a filter system that, with a simple and mechanically stable design, allows use of a seal and also replacement if there is a maintenance action.

It is a further object of the invention to provide a sealing device for use in such a filter system that, with a simple and mechanically stable design, allows use of a seal and also replacement if there is a maintenance action.

The aforementioned objects are achieved according to one aspect of the system by a filter system that comprises a sealing device, which is arranged between a first housing part and a second housing part, for sealing a housing interior space from a surrounding environment, wherein the sealing device has a seal arranged on a seal carrier.

Beneficial configurations and advantages of the invention arise from further claims, the description and the drawing.

A filter system for filtering a fluid is proposed that has a filter element, a filter housing—which comprises a first housing part and a second housing part, in which the filter element is arranged—and a sealing device, for sealing off a housing interior space from the surrounding environment, arranged between the first housing part and a second housing part. The sealing device has a seal arranged on a seal carrier. In this arrangement, at least one radially inward interior surface of the seal abuts against a radially outward contact side of the seal carrier and the seal is radially inwardly supported by the contact side, and/or the seal has at least one retaining contour for securing the seal to the seal carrier and/or wherein the seal carrier has at least one coupling element for connection to the first housing part and/or the second housing part.

The filter system according to the invention has a sealing device that comprises a seal, for example a round cord or a continuous seal with any desired cross-section on a seal carrier, which can be formed out of hard and dimensionally stable plastic. Seal and seal carrier are preferably made from different elastic materials, thereby representing a functional separation of seals and supports. The seal can be held on the seal carrier in a stable and service-friendly manner via a retaining contour for installation/removal. The seal carrier thus serves as an installation and removal aid. The sealing device seals off an interface between a first housing part and a second housing part of the filter housing from the surrounding environment, wherein the interface with the sealing device does not have to coincide with an interface for screwing or clipping. The two interfaces can also be axially spatially separated, which can even be a substantial advantage for the stability of the filter housing seal. The functions of the mechanical closure of the filter housing and the sealing are therefore separated from each other.

The sealing device can have tabs that make for an easy replacement of the seal. Furthermore, the sealing device can be connected via coupling elements to one of the two housing parts, preferably the cover or the housing part situated on top in a stationary assembly, which is beneficial for a service-friendly maintenance procedure because the seal remains in the unscrewed cover of the filter housing. The coupling elements can have snap or latch elements which acoustically signal a successful assembly. The seal carrier represents a stable frame as a stiffening element for the seal. Therefore, the seal carrier also has a different elasticity than the seal and is preferably made of a rigid material. This ensures an axial stability of the seal during joining, during transport and packing, and during installation, because in this way no twisting of the seal within the package and no slippage when screwing on the filter system can occur if there is poor wetting with the fluid. As service parts, the seal and filter element can be held together by the sealing device. Moreover, there is a so-called "Poka Yoke" effect for the assembly in initial outfitting and maintenance operations because the sealing device has a symmetrical structure and can be installed in both possible installation directions. Furthermore, it is possible to eliminate a tab on the seal, which, while it may be helpful for the removal of the seal, can nevertheless be a disruptive element, interfering with the insertion of the sealing device in a groove of the filter housing. Rather, the coupling elements arranged on the seal carrier can now be used as tabs, so that the seal carrier can be removed from the filter housing together with the seal by pulling on the coupling elements, for example, with pliers.

The sealing device has multiple advantages: It can serve as an installation aid. It has an inherent support ring due to the seal carrier. It serves as a removal aid during servicing operations. It represents an intrinsic stabilization of the seal.

Through the seal carrier, the seal can be connected to the filter element in an alternative design.

Advantageously, the seal in the installed state can be axially and radially compressed when the filter housing is closed. The seal is first compressed axially by the axial approach of the two housing parts, while at the same time sealing surfaces of the seal that are arranged diagonal to the longitudinal axis are radially inwardly compressed and thereby effect a radial compression of the seal because in so doing an inner surface of the seal can evenly abut its mating surface, a contact surface of the seal carrier, and is radially outwardly supported by the seal carrier. In this way a self-reinforcing sealing system is obtained that requires no further mechanical compression. Thus, the sealing device does not serve as a stop when the filter housing is closed. Rather, a mechanical stop is expediently provided on the filter housing that is closed, for example, via a screw thread, so that the screwed connection can only occur if the two housing halves rest against the stop. The seal can be compressed only in a precisely defined manner to a certain degree such that a reliable and continuous sealing function is ensured. The seal is thus in a state of equilibrium.

The seal also centers itself during assembly in the first housing part and when the filter housing is closed by the second housing part itself. It is precisely when used as an oil filter of an internal combustion engine in a motor vehicle in which the housing interior space is impinged with pressure and where the seal should reliably operate at temperatures from −40° C. to 150° C. with pressures up to 4.5 bar, in peaks up to 25 bar, that such a self-centering sealing system is of great advantage, because also when there is mechanical pumping of the filter housing because of alternating pressure ratios the sealing function is retained and ensured.

In one advantageous embodiment, the seal can be chambered between the first housing part, the second housing part and the seal carrier. The chambering is more advantageously created by a sealing surface abutting a component sealing surface of the first housing part, a sealing surface abutting a component sealing surface of the second housing part and an inner surface of the seal abutting the contact side of the seal carrier, wherein the seal in the installed condition is arranged in a sealing groove formed from the component sealing surface and an interior wall.

Advantageously, the seal can project in the axial direction from a sealing groove of the first and/or second housing part. In particular, the seal in the compressed state can project from the sealing groove of the first and/or second housing part. The interior wall of the sealing groove in this way covers an axial expansion of the seal by half at the most, preferably no more than a third. Furthermore, the groove depth of the sealing groove thus extends only partially over a component sealing surface on the same housing part. In particular in the dense, that is, the compressed state of the seal, the seal projects in the axial direction from a sealing groove. Advantageously, the seal projects from the sealing groove at least 50%, in particular 70% and most advantageously 80% of its axial expansion in the compressed state. In this way, a reliable and continuous sealing function of the sealing device is ensured. Typically, approximately one fourth of the axial expansion of the seal should be available for the compression of the seal.

According to one advantageous configuration, the seal can have a base part and at least one axial projection, wherein the base part abuts against the radially outward contact side of the seal carrier via its radially inward inner surface and is radially inwardly supported, at least in the compressed state, by the contact side. Therefore, the inner surface in the compressed state advantageously has an axial expansion of at least 50% of the axial expansion of the seal. In this way the two functions are: supporting the seal in the radial direction and performing the actual sealing function in structural elements that are separate from each other. All radial forces on the seal can thus be absorbed by the seal carrier.

According to another advantageous embodiment, the at least one axial projection can be provided for abutment against a component sealing surface of the first housing part or a component sealing surface of the second housing part. The axial projection can thus be advantageously configured for exercising a sealing function together with the component sealing surface. The radial support function of the seal can be implemented separately.

Advantageously, the sealing line on the housing side, seen in the axial direction, can be located in the area of the filter bellows and is therefore clearly axially displaced from the end disks.

In one advantageous embodiment, a component sealing surface of the one housing part can be arranged in the axial direction outside of the sealing groove of the other housing part, which allows greater design freedom in the mounting of the sealing groove in one of the two housing parts.

Expediently, an expansion of the seal, especially in the compressed state, can be greater in the axial direction than an expansion of the seal in the radial direction. This design is advantageous because, as a result, the seal can absorb a greater compression travel in the axial direction when the two housing halves of the filter housing are screwed together, which is particularly beneficial when a screw thread is used. Advantageously, the seal also has a greater axial expansion in the compressed state, therefore, than a radial expansion.

Advantageously, the sealing device can be arranged as a built-in component within the housing. This makes it possible to very easily and reliably install the sealing device. The risk of damage to the seal during transport and assembly is thereby minimized.

Advantageously, the sealing device can be secured to one of the two housing parts. However, such a mounting is advantageous both for the assembly of the filter housing and for the opening and re-closing of the two housing parts because the seal does not get lost and a new seal can thus also be installed without risk of damage.

In one advantageous embodiment, one of the housing parts can be designed for the removal of the other housing parts and the seal carrier can be fastened to the one housing part of the two that is removable. The design of one of the housing parts as a removable cover favors the mounting of the seal carrier on this cover, also thereby enabling reliable installation and removal of the seal without risk of damage.

Advantageously, the at least one coupling element can engage in a coupling receptacle on an inner side of the first housing part and/or of the second housing part. The coupling receptacle can thus preferably be designed in the form of a groove in order to thereby achieve a reliable connection between coupling element and coupling receptacle. In particular, the at least one coupling element can have a latching of the carrier with the first housing part and/or the second housing part. As a result, the sealing device can be connected with the second housing part, for example the cover of the filter housing, so that the seal can be removed together with the cover, for example, when the cover is removed to change the filter element, and the risk of soiling and damage to the seal is diminished. Furthermore, better access to the seal and easier maintenance are advantageous. The interaction of the coupling element and coupling receptacle can effect an axial positioning of the sealing device in the filter housing, that is, the first and/or the second housing part.

A latch mechanism enables the seal carrier to be easily joined without any additional tools to the second housing part, for example the cover, and remain connected to it even when the second housing part is removed from the first housing part. The latch mechanism also provides an acoustic and haptic verification of the assembly process, which for quality reasons represents a great advantage with such an important component for the function of the filter system.

In one advantageous embodiment, it is beneficial if the seal has only one sealing surface at each of the two housing parts. Thus, there is a reliable sealing effect when the filter housing is assembled, wherein the danger of damage to a sealing surface of the seal is minimized in this way during the assembly.

Expediently, the seal carrier in the installed state can abut a contact surface of one of the components in the axial direction and be fixed in its axial position. An axial positioning of the sealing device can thus be accomplished via the interaction of coupling element and coupling receptacle. This achieves a beneficial positioning of a sealing surface of the seal relative to this contact surface as the sealing surface of the component. This minimizes the risk of a sealing surface being damaged during the assembly.

In an advantageous embodiment, the two sealing surfaces are inclined, at least in some sections, with respect to a longitudinal axis of the sealing device. Preferably, the two sealing surfaces have a (smooth) curvature with respect to the longitudinal axis in the uncompressed state. Such an inclination with respect to the longitudinal axis of the sealing device causes the seal to be axially and radially compressed when the filter housing is closed by screwing together the two housing parts, thereby increasing the reliability of sealing off the filter housing from the surrounding environment.

Preferably the seal and the seal carrier can be designed mirror-symmetrically with respect to the axial center of the sealing device, so that the sealing device can be installed in both orientations, which increases the flexibility of installation.

Advantageously, the at least one retaining contour of the seal can have one or more latching elements that engage in corresponding cut-outs of the seal carrier. In this way it can be ensured that the seal remains continuously connected to the seal carrier and remains continuously connected during transport as well as during installation and in maintenance interventions, which greatly simplifies the assembly and can minimize the risk of soiling and/or damage to the seal during transport and assembly. In an expedient embodiment, the at least one retaining contour can have a positive-fit connection to the seal carrier. It is possible for the seal to be sprayed onto the seal carrier so that a solid, durable, positive-fit connection of seal and seal carrier can be ensured. Alternatively, seal and seal carrier can be produced as a two-component module in a plastic injection molding process, so that it is also possible to advantageously produce a continuous and positive-fit connection. Moreover, such a production method represents a very fast and economical process. In a further alternative, the seal can be inserted with a central, radially inward bead, which is enlarged for the assembly, into a central, radially outward groove of the seal carrier. In this way, the seal is firmly secured to the seal carrier and cannot slip or in any other way change its position during assembly and when the filter housing is being closed.

Such an arrangement advantageously ensures an axial and a radial seal because the two sealing surfaces, which are arranged at an angle to each other, allow an axial and a radial compression of the seal. The seal therefore resembles a U-shaped bed. A diagonally running sealing surface of the seal at the top abuts a component sealing surface of the second housing part, for example, while a diagonally running sealing surface of the seal at the bottom can abut a component sealing surface of the first housing part. When the two housing parts are closed, the seal is compressed against the two component sealing surfaces and thereby reliably seals off the housing interior space from the surrounding environment.

In a further advantageous embodiment, it is also conceivable to connect the sealing device to the filter element so that the sealing device can be transported, stored and installed together with this filter element, thereby preventing any confusion of the sealing device. Furthermore, a secure installation and removal of the sealing device together with the filter element is possible in this alternative. This ensures that the replacement of the seal also occurs together with the replacement of the filter element. According to a further aspect, the invention relates to a sealing device for installation in a filter described above that comprises a seal arranged on a seal carrier. In this arrangement, a radially inward inner surface of the seal abuts against a radially outward contact side of the seal carrier and is radially inwardly supported by the contact side and/or the seal has at least one retaining contour for attachment to the seal carrier and/or the seal carrier has at least one coupling element for connection to the first housing part and/or the second housing part.

The sealing device comprises a seal, for example a round cord or a continuous seal with any desired cross-section on a seal carrier, which can be formed out of hard and dimensionally stable plastic. The seal can be held on the seal carrier in a stable and service-friendly manner via a retaining contour for installation/removal. The seal carrier thus serves as an installation and removal aid. The sealing device seals off an interface between a first housing part and a second housing part of the filter housing from the surrounding environment, wherein the interface with the sealing device does not have to coincide with an interface for screwing or clipping. The two interfaces can also be axially spatially separated which can even be a substantial advantage for the stability of the filter housing seal. The sealing device can have tabs that make for an easy replacement of the seal.

Furthermore, the sealing device can be connected via coupling elements to one of the two housing parts, preferably the cover or the housing part situated on top in a stationary assembly, which is beneficial for a service-friendly maintenance procedure because the seal remains in the unscrewed cover of the filter housing. The coupling elements can have snap or latch elements which acoustically signal a successful assembly. The seal carrier represents a stable frame for the seal. This ensures an axial stability of the seal during joining, during transport and packing, and during installation, because in this way no twisting within the package and no slippage when screwing on the filter system can occur if there is poor dampening with the fluid. As service parts, the seal and filter element can be held together by the sealing device. Moreover, there is a Poka Yoke effect for the assembly in the initial outfitting and maintenance operations. There are also no tabs, which can be a disruptive element, interfering with the insertion of the sealing device in a groove of the filter housing, because the seal is stabilized in the sealing groove.

The sealing device therefore has the following advantages: It can serve as an installation aid. It has an inherent support ring due to the seal carrier. It serves as a removal aid during servicing operations. It represents an intrinsic stabilization of the seal. Through the seal carrier, the seal can also be connected to the filter element.

According to a further aspect, the invention relates to an arrangement of a filter element that comprises at least one end disk and a filter bellows and a sealing device as described above, wherein a seal carrier of the sealing device is arranged at a radial outer circumference of the filter element. A filter element of this type can thus be stored, transported, installed and removed together with the sealing device. This minimizes any confusion of the appropriate seal for the filter system. Furthermore, soiling and/or damage to the seal during transport and assembly can thereby be more easily prevented.

Advantageously, the arrangement of a filter element and a sealing device can be designed in such a way that the sealing device has a common seal arranged on the seal carrier to seal off the clean side from the unfiltered side of the filter element and/or to seal off a first housing part and a second housing part of the filter system from the surrounding environment. A design of this type can be realized by the seal carrier sealing fluid tight against the filter element. The advantage of a common seal lies not only in that a component can be spared, but also in that the sealing can function more reliably because sealing only takes place at one site where the seal is compressed. Thus, the seal can advantageously be arranged as one unit on the filter element.

Preferably, the invention relates to the use of the filter system as an oil or fuel filter. In these fluid filters, typically a replacement of the filter element is necessary after a predetermined running performance, so that the filter system must be opened at regular intervals, the filter element must be removed and a new filter element must be inserted. With the sealing device of the present invention, it is possible in an advantageous manner to replace the seal reliably and in a maintenance-friendly way. A permanent sealing of the filter system following the replacement of the filter element is thus advantageously possible. Because the filter element and seal are expediently stored in a service unit and are made available on the occasion of a maintenance operation, it is ensured that the correct seal is used when the filter element is replaced.

BRIEF DESCRIPTION OF THE DRAWINGS

Further advantages arise from the following drawing description. The drawings show exemplary embodiments of the invention. The drawings, the description and the claims contain numerous features in combination. The person skilled in the art will expediently consider the features individually and combine them into meaningful further combinations.

In the Drawings, by Way of Example.

DETAILED DESCRIPTION

Figure 1:
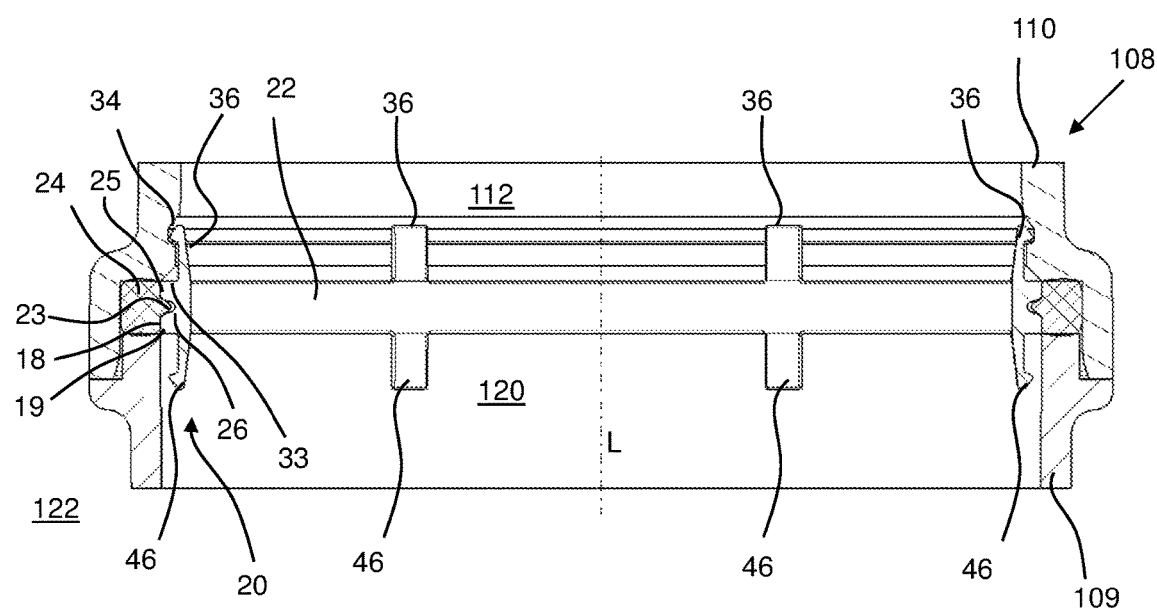
FIG. 1 is a sectional view of a schematically illustrated junction of a filter housing with a focus on the sealing of the filter housing depicted with sealing device inserted according to an exemplary embodiment of the invention.

The same or similar components in the figures are referenced with same reference characters. The figures merely show examples and are not intended to be restrictive.

FIG. 1 shows a sectional view of a schematically illustrated junction of a filter housing 108 with a focus on the sealing of the filter housing, depicted with a sealing device 20 installed according to an exemplary embodiment of the invention.

The filter system 100 according to the invention for filtering a fluid comprises a filter element 10 (depicted in FIG. 4), a filter housing 108—which comprises a first housing part 109 and a second housing part 110, in which filter element 10 is arranged—and a sealing device 20 arranged between the first housing part 109 and the second housing part 110 for sealing off a housing interior space 120 from a surrounding environment 122, wherein the sealing device 20 has a seal 24 arranged on a seal carrier 22. In this system, at least one radially inward inner surface 18 of seal 24 abuts against a radially outward contact side 25 of seal carrier 22 and is radially inwardly supported by the contact side 25. Seal 24 has a retaining contour 23 for securing seal 24 to seal carrier 22. Seal carrier 22 has a plurality of coupling elements 36 for connection to second housing part 110. Preferably seal 24 and seal carrier 22 can be designed mirror-symmetrically with respect to the axial center of sealing device 20, so that sealing device 20 can be installed in both orientations, which increases the flexibility of installation.

A filter element 10 is not depicted in FIG. 1 for reasons of visual clarity. By contrast, a part of a first housing part 109 that is connected to a second housing part 110 and sealed off via sealing device 20 is depicted. A plurality of coupling elements 36 engage here in a groove-form coupling receptacle 34 on the inner side 112 of second housing part 110. In this way, sealing device 20 is secured to housing part 110. Housing part 110 is designed for the removal of the other housing part 109, and seal carrier 22 is attached to the one of the two housing parts 109, 110 that is removable.

Coupling elements 36 expediently have a latching of seal carrier 22 with second housing part 110 that can communicate a successful installation of seal carrier 20 on second housing part 110 both acoustically by a click and haptically. Because sealing device 20 is mirror-symmetrically designed, it can also be installed in a different orientation so that coupling elements 46 can engage in the coupling receptacle 34. Alternatively, coupling receptacle 34 could also be arranged in first housing part 109.

If sealing device 20 is latched to second housing part 110 via coupling elements 36 and if it is removed with this housing part 110, sealing device 20 can be removed from housing part 110 via coupling elements 46. With a latching of coupling elements 46 in a housing part 109, the sealing device can then be removed from housing part 109 via the free coupling elements 36.

Seal 24 is axially and radially compressed in the installed state with filter housing 108 closed because seal 24 in this exemplary embodiment is chambered between first housing part 109, second housing part 110 and seal carrier 22.

Sealing device 20 is arranged in the exemplary embodiment depicted in FIG. 1 as a built-in part in housing 108. Seal carrier 22 in the installed state abuts in the axial direction against a contact surface 33 of housing part 110 and is fixed in its axial position. In this way, it is ensured that seal 24 is fixed in the correct position when the two housing parts 109, 110 are assembled and cannot fall out or be damaged when incorrectly positioned. Nevertheless, seal carrier 22 and seal 24 should still have enough space in their position to move far enough when filter housing 108 is closed that seal 24 in a suitable position can abut against the sealing surfaces 19, 21 of the two housing parts 109, 110, thereby ensuring a reliable sealing function. Seal carrier 22 can abut the two housing parts 109, 110 in a force-free manner without affecting the pre-centering of seal 24. Consequently, a slight amount of play—typically 5/10 mm at most—in seal carrier 22 in its installation position is beneficial.

Figure 2:
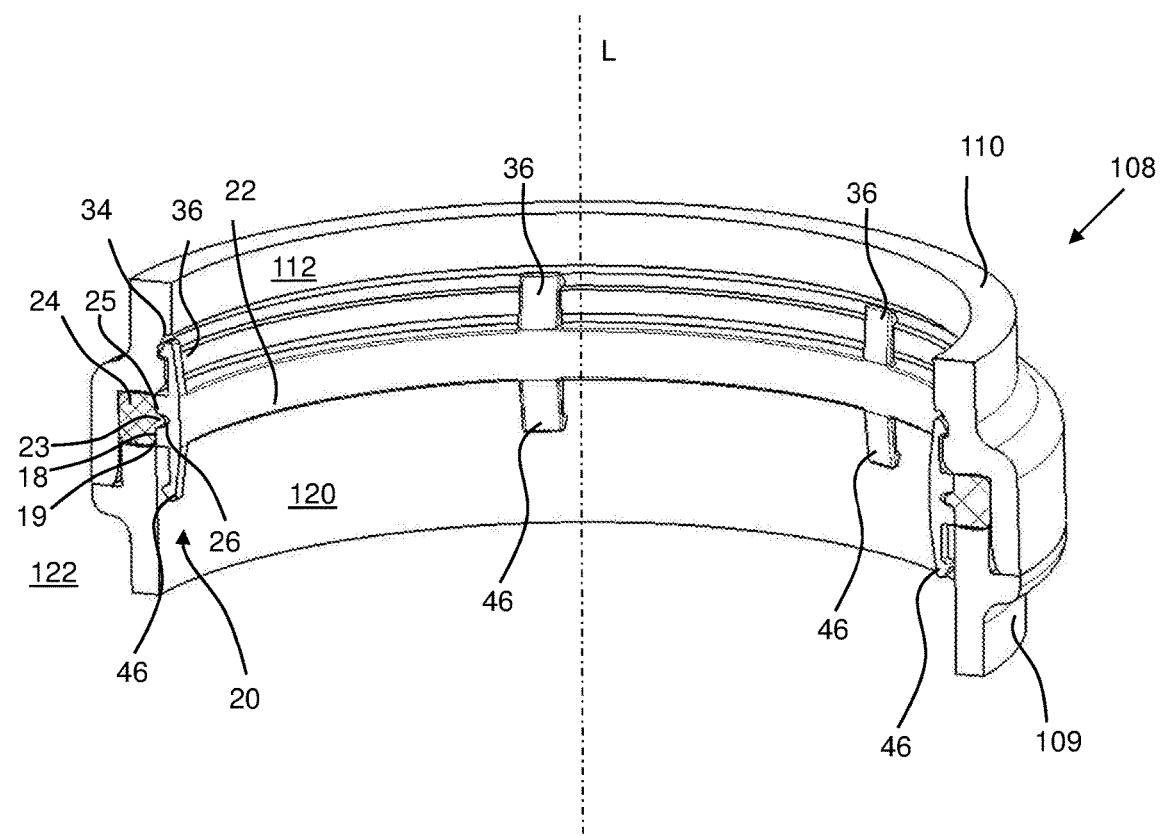
FIG. 2 is an isometric sectional view of a part of the filter housing with sealing device inserted according to FIG. 1.

FIG. 2 shows an isometric sectional view of a part of filter housing 108 with the sealing device 20 according to FIG. 1 inserted. The physical expansion of sealing device 20, which by coupling elements 36 engages inner side 112 of second housing part 110 in groove-form coupling receptacle 34, is visible here. The seal carrier is designed here as a sturdy ring that carries seal 24, which is secured with retaining contour 23 in the receptacle 26 of seal carrier 22. In this way, seal 24 cannot shift or be damaged during the installation/removal of sealing device 20, or second housing part 110 on which sealing device 20 is arranged.

Figure 3:
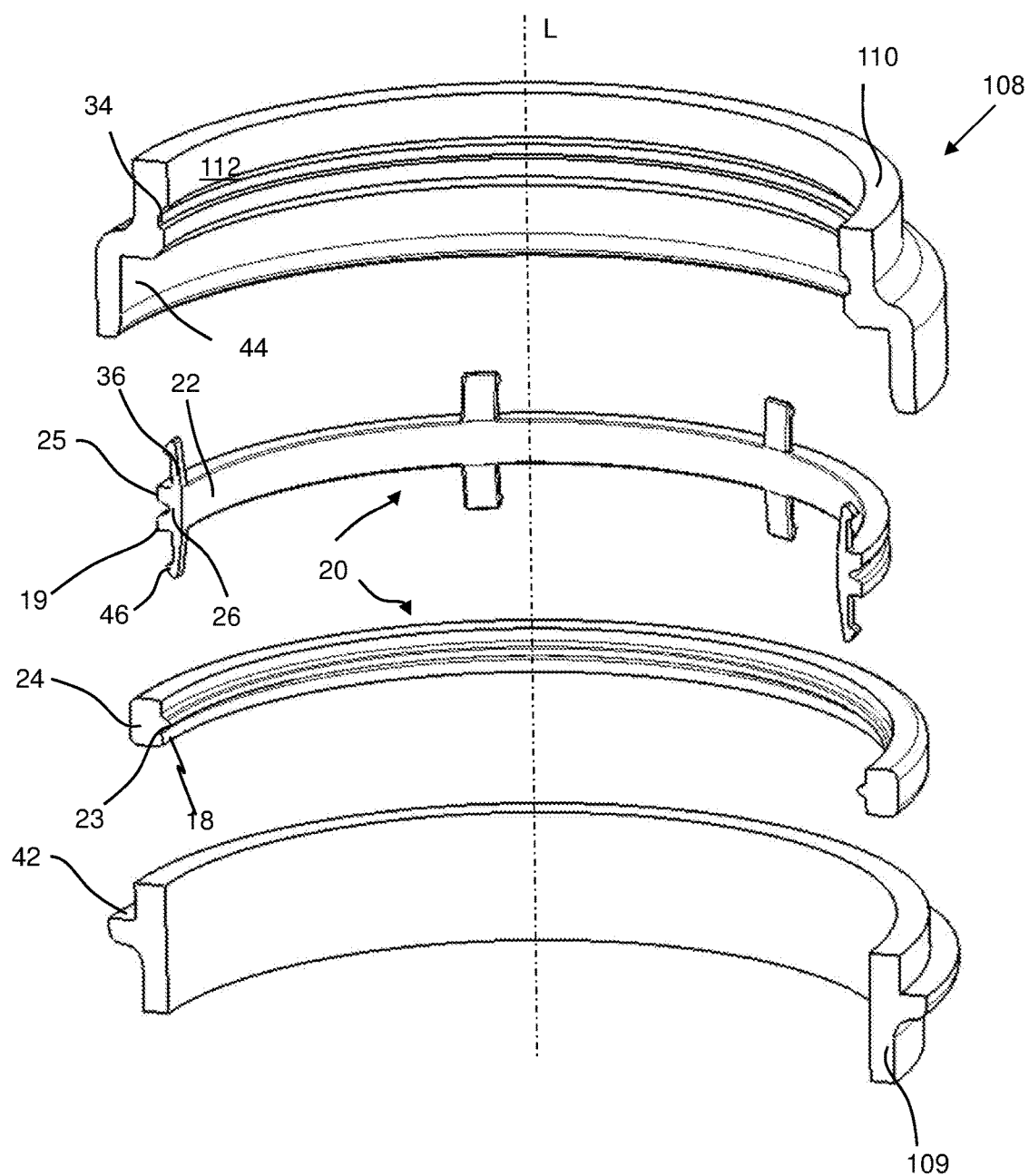
FIG. 3 is an exploded view of a part of the filter housing with a sealing device according to FIG. 1.

In addition, FIG. 3 shows an exploded view of a part of filter housing 108 with sealing device 20 according to FIG. 1. In this way, the individual parts of second housing part 110, seal carrier 22, seal 24 and first housing part 109 are recognizable with the connection-relevant details in its design. The seal can be inserted with a central, radially inward bead as retaining element 23, which is enlarged for the assembly, into a central, radially outward groove of seal carrier 22. In this way, seal 24 is firmly secured to seal carrier 22 and cannot slip or in any other way change its position during assembly and when filter housing 108 is being closed.

Seal carrier 22 is designed mirror-symmetrically in the shown exemplary embodiment so that coupling elements 36 for connection to second housing part 110 and coupling elements 46 for connection to a first housing part 109 are of identical design. As a result, the orientation of sealing device 20 is of no consequence in its installation. Alternatively, coupling elements 36 and coupling elements 46 can also have a different design. If seal carrier 22 is engaged via coupling elements 36, for example, with second housing part 110, that is, the cover of filter housing 108, for example, and accordingly is removed with this housing part 110, sealing device 20 can be pulled out and removed with pliers from second housing part 110 via the free coupling elements 46 of seal carrier 22. In this case coupling elements 46 represent an advantageous replacement for maintenance tabs that are typically arranged on seal 24.

Figure 4:
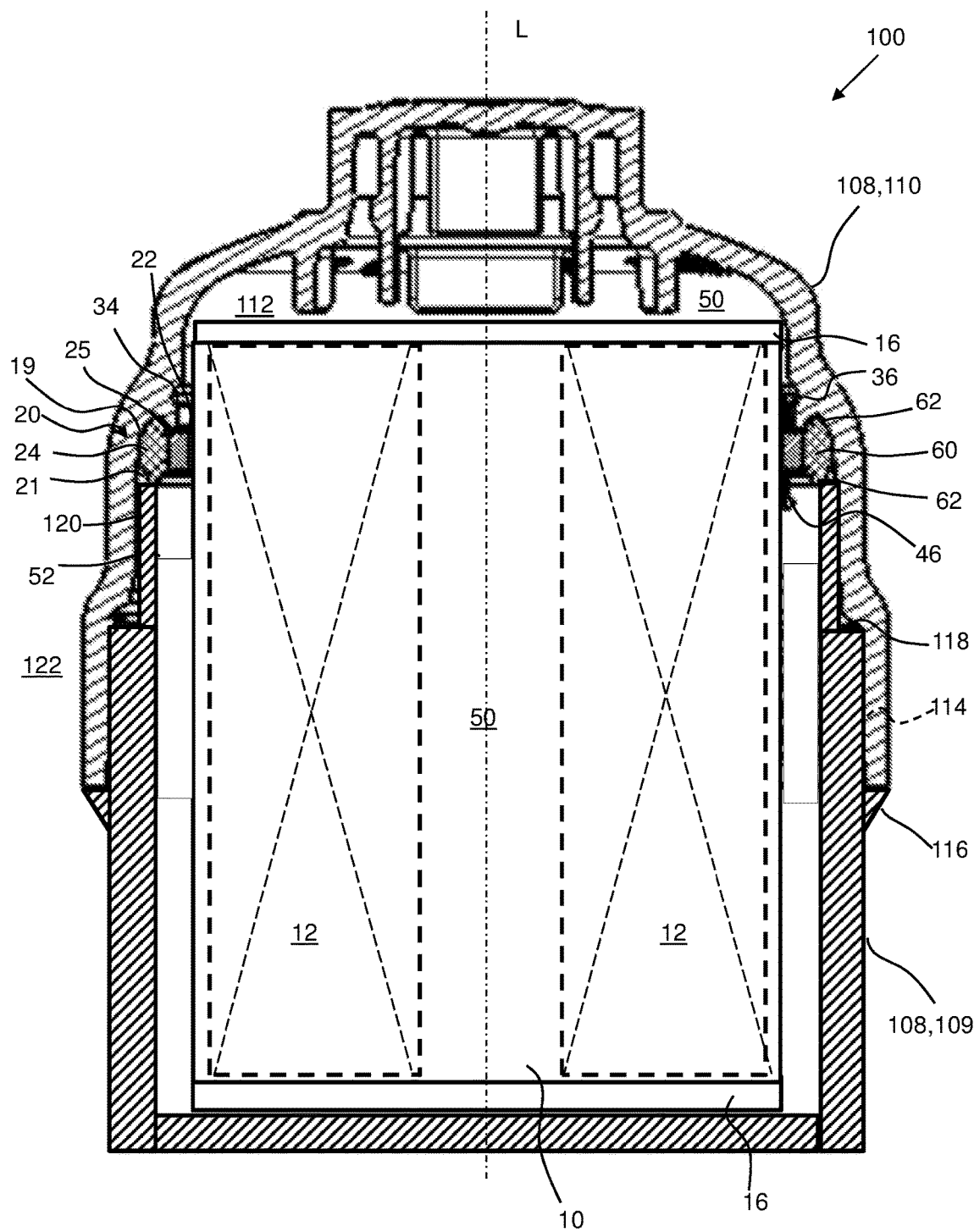
FIG. 4 is a sectional view of a filter system according to a further exemplary embodiment of the invention.

FIG. 4 shows a cross-sectional view of a filter system 100 according to a further embodiment of the invention. Arranged in the interior of filter housing 108 is a filter element 10, which is depicted purely diagrammatically. Filter housing 108 comprises a first housing part 109, a "pot," and a second housing part 110, a "bell," which is employed as a housing cover. First housing part 109 and filter element 10 are sketched here purely diagrammatically. Second housing part 110 is screwed onto first housing part 109, wherein the screw threads 114 are not visible in the installed state because they are arranged on the inner side of the housing. Second housing part 110 can be screwed on up to a stop 116 running around the perimeter of first housing part 109 and thereby secured. In this arrangement, a gap remains above the threaded collar of first housing part 109 between it and housing part 110. The stop 118 therefore defines the degree of compression of seal 24 between first housing part 109 and second housing part 110.

Figure 6:
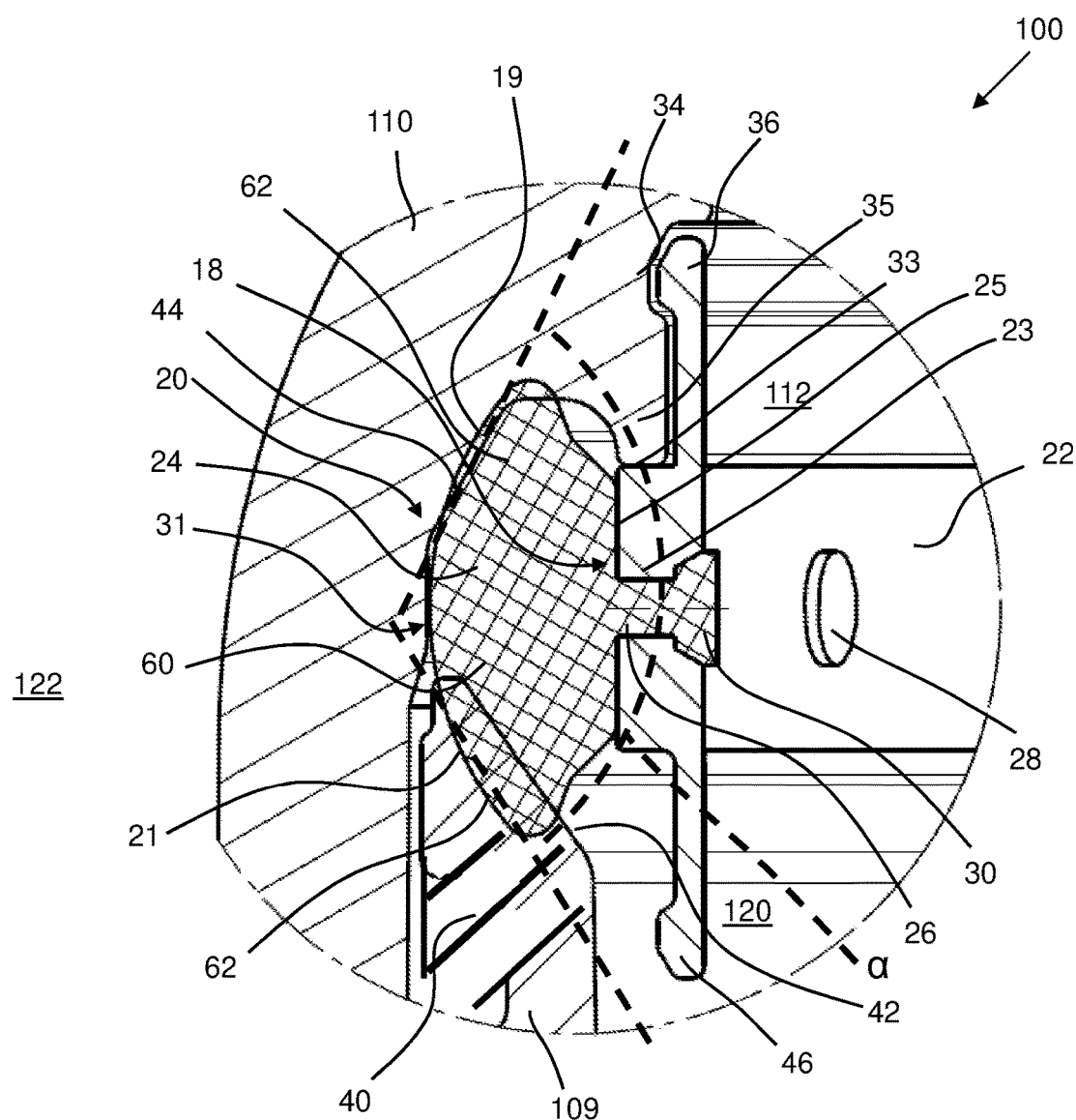

A seal 24 of a different type is shown in FIG. 4. The seal 24 has a base part 60 and two axial projections 62, wherein the base part 60 abuts the radially outward contact side 25 of the seal carrier 22 via the radially inward inner surface 18 and is radially inwardly supported by the contact side 25. The inner surface 18 in this case has an axial expansion of approximately 50% of the axial expansion of the seal 24. The axial projections 62 are provided for abutment against the component sealing surface 42 of first housing part 109 and against the component sealing surface 44 of second housing part 110. More exact details of seal 24 and its sealing function are illustrated in FIG. 6.

In FIG. 4, first housing part 109, second housing part 110 and seal carrier 22 form a chamber for sealing device 20 that comprises at least two sealing surfaces 19, 21 assigned to housing parts 109, 110 and retaining contour 23. Seal 24 has only one sealing surface 19, 21 on each of the two housing parts 109, 110. The two sealing surfaces 19, 21 are inclined, at least in some sections, with respect to a longitudinal axis L of sealing device 20. This seal 24 with a half-moon or oval cross-section is shown in detail in FIG. 6. In FIG. 6, the interplay with first housing part 109 is also shown in greater detail. Sealing surfaces 19, 21 are shown in FIG. 6. The sealing device 20 according to the present invention has the advantage that the axial/radial sealing is quickly engaged when filter housing 108 is screwed on, and, thus, a faster ventilation of filter system 100 is accomplished compared to the prior art. In a stationary filter system arrangement, it is sufficient when opening the filter system to unscrew second housing part 110 approximately a half thread rotation so that seal 24 releases and the fluid in the housing interior space 120, oil for example, can drain out completely. After the fluid has drained out, second housing part 110 along with sealing device 20 arranged thereon, can be removed. Alternatively, sealing device 20 can also remain on filter element 10 and be removed together with it.

In FIG. 4, an arrangement of a filter element 10, which comprises two end disks 16 and a filter bellows 12, and sealing device 20 is depicted in filter system 100, wherein seal carrier 22 of sealing device 20 is arranged outside of the radial outer perimeter of filter element 10.

In an alternative embodiment, the sealing device 20 can also have a common seal 24 arranged on seal carrier 22 for sealing off the clean side 50 from the unfiltered side 52 of the filter element 10 and/or sealing off a first housing part 109 and a second housing part 110 of the filter system 100 from a surrounding environment 122. A design of this type can be realized by the seal carrier sealing fluid-tight against the filter element.

Figure 5:
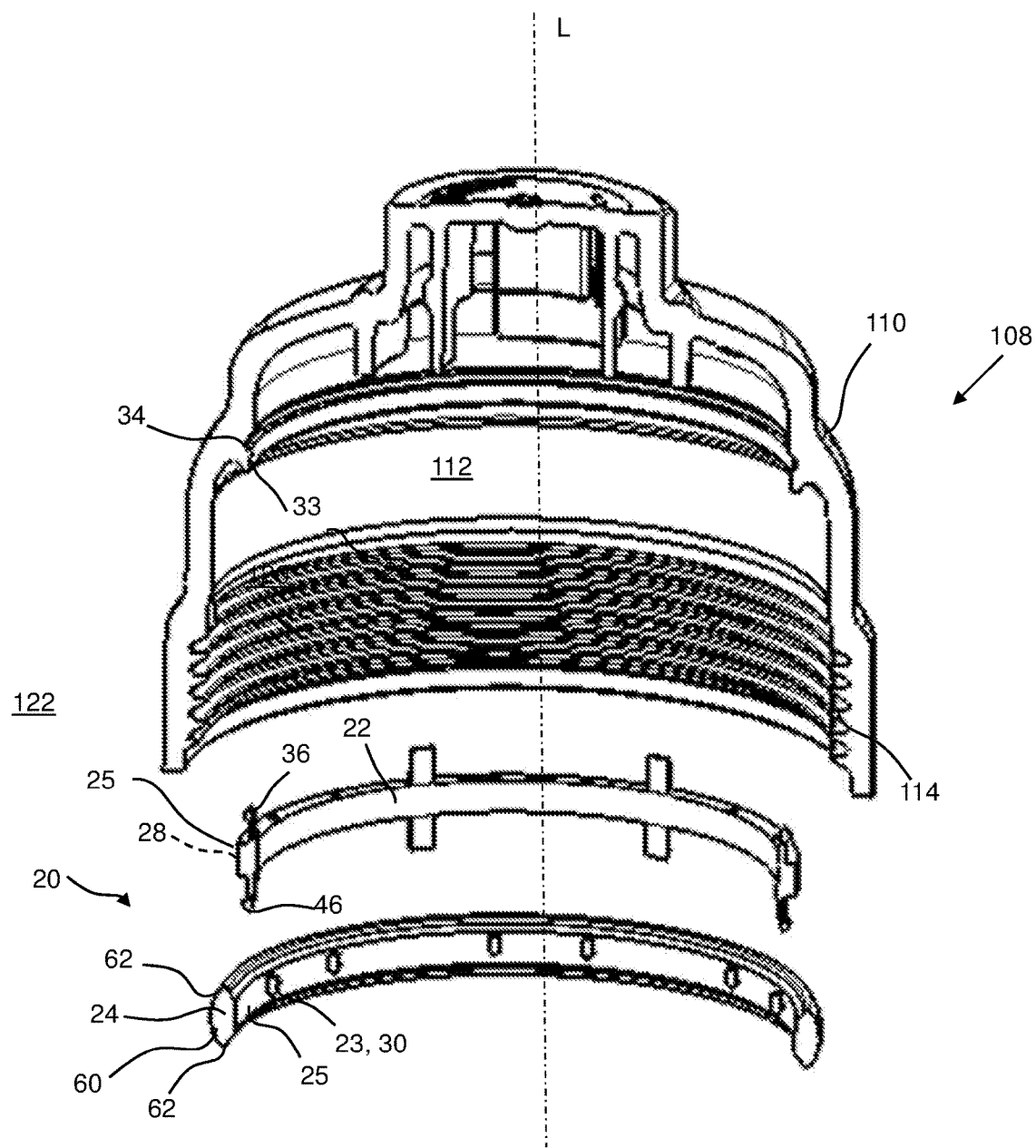
FIG. 5 is an isometric exploded view of a part of the filter system according to FIG. 4; the second housing part in the form of a cover with a sealing device is depicted; and, FIG. 6 is a sectional view through a part of a filter system according to FIG. 4 with a focus on the installed sealing device.

Shown in FIG. 5 is an isometric exploded view of the filter system 100 according to FIG. 4. A second housing part 110 is depicted with sealing device 20. In this arrangement on contact side 25 of seal 24, it can be seen that retaining contour 23 of seal 24 has multiple latching elements 30 which engage in corresponding cutouts 28 of seal carrier 22. The cutouts 28 are not shown in FIG. 5 because they are on the outside of seal carrier 22 so that the latching elements 30 of seal 24, which is situated on the outside of seal carrier 22, can engage in these cutouts 28, which can be configured, for example, as bore holes. Retaining contour 23 can in this way have a positive-fit connection to seal carrier 22.

Alternatively, the connection of seal 24 with seal carrier 22 can be designed as illustrated in FIG. 6. To accomplish this, seal carrier 22 can be inserted in a tool and be coated around its perimeter with a sealing compound to create seal 24. Bore holes can be placed in seal carrier 22 and filled with an elastomer in a two-component process. These elastomer fills then represent the retaining contour 23, which create a mechanical anchoring of seal 24 with seal carrier 22.

FIG. 6 shows a sectional view through a part of a filter system 100 according to FIG. 4 with a focus on the installed sealing device 20. Sealing device 20 comprises a seal 24 arranged on a seal carrier 22. The seal 24 has a base part 60 and two axial projections 62, wherein the base part 60 abuts the radially outward contact side 25 of the seal carrier 22 via the radially inward inner surface 18 and is radially inwardly supported by the contact side 25. The inner surface 18 in this case has an axial expansion of approximately 50% of the axial expansion of the seal 24.

The axial projections 62 are provided for abutment against the component sealing surface 42 of first housing part 109 and against the component sealing surface 44 of second housing part 110. Such an arrangement advantageously ensures an axial and a radial seal because the two sealing surfaces 18, 19, which are arranged at an angle to each other, allow an axial and a radial compression of seal 24. Seal 24 therefore resembles a U-shaped bed. A diagonally running sealing surface 19 of seal 24 at the top abuts a component sealing surface 44 of second housing part 110, for example, while a diagonally running sealing surface 21 of seal 24 at the bottom can abut a component sealing surface 42 of first housing part 109. When the two housing parts 108, 109 are closed, seal 24 is compressed against the two component sealing surfaces 42, 44 and thereby reliably seals off the housing interior space 120 from surrounding environment 122.

Furthermore, seal 24 has a retaining contour 23 for fastening to seal carrier 22. Moreover, seal carrier 22 has a coupling element 36 for connection to second housing part 110. Seal 24 is shown in FIG. 6 with its contours above the boundary of first housing part 109 and second housing part 110. In reality, the seal is of course pressed together during the installation and then abuts against these boundary surfaces. From the housing interior 120, an overpressure prevailing in filter system 100 can impinge seal 24 and thereby press sealing surface 19 against the corresponding component sealing surface 44 of second housing part 110 and sealing surface 21 against the corresponding component sealing surface 42 of projection 40 of first housing part 109. This makes it possible to produce a reliable and continuous sealing of filter housing 108 between housing interior 120 and surrounding environment 122.

Seal 24 projects in the axial direction out from a sealing groove 31 of the first and/or second housing part 109, 110. A component sealing surface 42 of the one housing part 109 is arranged in the axial direction outside of sealing groove 31 of the other housing component 110. An expansion of seal 24 is greater in the axial direction than an expansion of seal 24 in the radial direction.

Retaining contour 23, which in FIG. 6 runs out into latching elements 30, in this exemplary embodiment passes through a bore hole 28 with undercut through seal carrier 22, which expediently can be produced by applying the material of seal 24 around seal carrier 22. In this way, seal 24 is applied to seal carrier 22 in a positive-fit manner that is secure against loss, because retaining contour 23 has a positive-fit connection with seal carrier 22. The entire sealing device 20 can thus also be produced as a two-component module in a plastic injection molding process. In this process, seal carrier 22 is first produced in an injection molding process with a relatively stiff plastic. Then seal 24 is applied to seal carrier 22 using the actual seal material. Especially advantageously, the latching elements 30 can be produced by overmolding onto a radially inward side of seal carrier 22 in the two-component injection molding process. A production process of this type can be configured very flexibly.

What is claimed is:

1. A filter system for filtering a fluid, comprising
   a filter element;
   a filter housing, comprising:
   a first housing part;
   a second housing part in which the filter element is arranged,
   a coupling receptacle formed into the radially inner side of a housing wall of the first housing part or the second housing part:
   wherein the first housing part and the second housing part mount together and enclose the filter element within in a housing interior space of the filter housing;
   the filter housing further comprising a sealing device for sealing off the housing interior space from a surrounding environment arranged between the first housing part and the second housing part, the sealing device of the filter housing having a seal arranged on a seal carrier;
   wherein the seal has at least one radially inner surface which abuts against a radially outer contact side of the seal carrier and is radially inwardly supported by the radially outer contact side of the seal carrier;
   wherein the seal has at least one retaining contour formed as a projection which projects radially inwardly from the radially inner surface of the seal, the retaining contour securing the seal to the seal carrier;
   wherein the seal carrier has a plurality of coupling elements extending axially outwardly from the seal carrier and contacting against a radially inner side of the housing wall of the first housing part;
   a latching member form on an axially outer end of the coupling elements, the latching member projecting radially inwardly from the axially outer end and received into and engaging into the coupling receptacle formed into the radially inner side of the housing wall of the first housing part or the second housing part, latching and securing the seal carrier onto the coupling receptacle of the housing, thereby latchably mounting the seal carrier onto the housing part having the coupling receptacle such that the seal carrier stays with the filter housing when the filter element is removed from the filter housing.

2. The filter system as claimed in claim 1, wherein the seal in the installed state with the filter housing is axially and radially compressed.

3. The filter system as claimed in claim 1, wherein the seal is chambered between the first housing part, the second housing part and the seal carrier.

4. The filter system as claimed in claim 1, wherein the seal projects in the axial direction from a seal groove of the first and/or second housing part.

5. The filter system as claimed in claim 4, wherein
a component sealing surface of the one housing part is arranged in the axial direction outside of the sealing groove of the other housing component.

6. The filter system as claimed in claim 1, wherein
the seal includes
a base part having a radially inward inner surface; and
an upper axial projection and a lower axial projection;
wherein the base part abuts the radially outward contact side of the seal carrier via the radially inward inner surface and is radially inwardly supported by the contact side;
wherein the radially inward inner surface has an axial expansion of at least 50% of the axial expansion of the seal from the upper axial projection to the lower axial projection of the seal.

7. The filter system as claimed in claim 6, wherein
the at least one axial projection contacts against a component sealing surface of the first housing part or against a component sealing surface of the second housing part.

8. The filter system as claimed claim 1, wherein
an expansion of the seal is greater in the axial direction than an expansion of the seal in the radial direction.

9. The filter system as claimed in claim 1, wherein
the sealing device is permanently secured into and provided as a unitary fixed piece of the housing.

10. The filter system as claimed in claim 1, wherein
the sealing device is securely mounted and fixed onto one of the two housing parts.

11. The filter system as claimed in claim 1, wherein
the seal has a first sealing surface that seals only against the first housing part, and a second sealing surface that seals only against the second housing part;
wherein the two sealing surfaces run diagonally with respect to a longitudinal axis (L) of the sealing device.

12. The filter system as claimed in claim 1, wherein
the seal carrier in the installed state abuts in the axial direction against a contact surface of either the filter housing or the first housing part and is fixed in its axial position.

13. The filter system as claimed in claim 1, wherein the at least one retaining contour of the seal has one or more latching elements that engage in corresponding cut-outs of the seal carrier.

14. A sealing device installable into a filter system according to claim 1, comprising:
a seal arranged against a seal carrier;
wherein the radially inward interior surface of the seal abuts against a radially outward contact side of the seal carrier; and
wherein the seal is radially inwardly supported by the contact side; and/or
wherein the seal has at least one retaining contour for securing to the seal carrier;
wherein the seal carrier has a plurality of coupling elements extending axially outwardly from an axially outer side of the seal carrier, an axially outer end of the plurality of coupling elements having a radially inwardly projecting latching member configured to engage into the coupling receptacle of the housing wall and thereby latchably mounting the seal carrier onto the housing.

* * * * *